US009213967B1

(12) United States Patent
Ferguson

(10) Patent No.: US 9,213,967 B1
(45) Date of Patent: *Dec. 15, 2015

(54) SYSTEM AND METHOD FOR A FRAME-BASED INTERNET ENABLED USER INTERFACE

(75) Inventor: Hill Ferguson, San Francisco, CA (US)

(73) Assignee: Yodlee, Inc., Redwood City, CA (US)

( * ) Notice: Subject to any disclaimer, the term of this patent is extended or adjusted under 35 U.S.C. 154(b) by 2587 days.

This patent is subject to a terminal disclaimer.

(21) Appl. No.: 10/699,492

(22) Filed: Oct. 31, 2003

(51) Int. Cl.
*G06Q 30/04* (2012.01)
*G06Q 20/10* (2012.01)
*G06Q 50/00* (2012.01)

(52) U.S. Cl.
CPC .............. *G06Q 20/102* (2013.01); *G06Q 30/04* (2013.01); *G06Q 50/01* (2013.01)

(58) Field of Classification Search
CPC combination set(s) only.
See application file for complete search history.

(56) References Cited

U.S. PATENT DOCUMENTS

| 6,101,510 | A  | * | 8/2000  | Stone et al. ................... 715/234 |
| 6,327,574 | B1 | * | 12/2001 | Kramer et al. ................ 705/14  |
| 6,385,595 | B1 | * | 5/2002  | Kolling et al. ................ 705/40  |
| 6,760,047 | B2 | * | 7/2004  | Hough et al. ................. 715/753 |
| 7,788,172 | B2 | * | 8/2010  | Kight et al. .................. 705/39  |
| 2003/0187968 | A1 | * | 10/2003 | McKnight ..................... 709/223 |
| 2003/0191711 | A1 | * | 10/2003 | Jamison et al. ............... 705/40  |
| 2004/0034559 | A1 | * | 2/2004  | Harris et al. .................. 705/14  |

* cited by examiner

*Primary Examiner* — Luna Champagne
(74) *Attorney, Agent, or Firm* — Donald R. Boys; Central Coast Patent Agency, Inc.

(57) ABSTRACT

A system and method for a frame-based internet enabled interface. In one embodiment, a system is disclosed for a client-side frame based internet enabled interface. The system comprises a first frame and a second frame in a window. The first frame encapsulates a resource from a third-party internet based service. The resource is requested by a user through an internet enabling software. In addition, the second frame comprises user-specific information that is related to content provided from the resource.

8 Claims, 6 Drawing Sheets

SYSTEM AND METHOD FOR A FRAME-BASED INTERNET ENABLED USER INTERFACE

BACKGROUND OF THE INVENTION

1. Field of the Invention

Embodiments of the present invention relate to the field of aggregation services. More particularly, embodiments of the present invention relate generally to client side credential based deep-linking to a third-party internet based service.

2. Related Art

Bill payment on-line over the Internet has the potential of making the task of paying monthly bills simpler, easier, and more satisfying than the traditional method of paying bills through the mail. Payment of bills over the Internet in the conventional art takes two forms: a bill consolidation model; and a direct billing model. Both of these models unsatisfactorily address the issue of consolidating all the bills of a client at one convenient location for paying bills.

The conventional bill consolidator model comprises a consolidated clearing house, whereupon all the services related to paying bills are accomplished at one location. In general, the bill consolidator goes out and retrieves bills from participating billers for a particular client. In addition, the bill consolidator also processes payments on bills for that client. In the case, where a bill consolidation is provided by a bank, consolidated bills are presented to the client, and the client can provide instructions to the bank to pay specific bills at one location, typically a web site.

While there are many problems associated with a bill consolidation model, the one great advantage is that the bill consolidation model provides a single location for a client to pay bills from various billers. However, problems with a bill consolidation model include costly infrastructure setup, the inability to view details of a bill, a delayed clearing time for payment of a bill, and a single source for payment. These problems overshadow the advantage of consolidation.

In particular, one problem associated with a bill consolidator model is that only those billers that actively participate in the model can send out bills and receive payments on those bills through the bill consolidator model. That is, each biller in the bill consolidator model must set up an electronic payment infrastructure that is compatible with the bill consolidator. Setting up the infrastructure is time consuming and costly for the biller. As such, billers tend not to participate within a bill consolidator model, as additional resources must be expended to ensure compatibility with the bill consolidator.

In addition, in a bill consolidation model, the client does not have an opportunity to view bills in full. That is, the client is presented with a summary of billing information by the bill consolidator. If a client is interested in detailed billing information, the client must reference the paper bill sent through the mail, or call customer service. This is unacceptable in an electronic payment model, as the convenience stems from avoiding sending out bills through the mail. In addition, since the client has set up an electronic payment system with a biller, that biller probably will not duplicate billing by sending out a bill through the mail in an effort to save costs.

Further, in a bill consolidation model, the clearing time for payment of a bill by the bill consolidator is usually delayed. The bill consolidator typically gathers up all the payments for bills to a particular biller, and sends those payments in bulk to reduce costs. As such, payment of a bill of a client to a particular biller may not occur for up to 7 days. In addition, there is no assurance by the biller to a client that a bill has been accepted as paid. That is, there is no immediate feedback from a biller that a bill has been paid. Thus, last minute payments are usually avoided in a bill consolidation model.

Moreover, in a bill consolidation model, there is only a single funding source for the payment of a bill. For example, bill consolidation that is provided by a bank will channel payments through the bank. As such, a client paying bills through the bank's bill consolidation model must carry an account at the bank (e.g., a checking account) and make all payments through that account. Other forms of payment are not allowed, such as, a credit card payment. As such, a client cannot choose which multiple forms of payment to pay a bill in a bill consolidation model.

The second form of electronic payment of bills is the direct billing model. Billers understand the benefits of switching to electronic payments, such as, decreased billing costs, advertisement opportunities, etc. As such, individual billers have developed their own web sites for clients to pay bills electronically. In the direct billing model, one biller allows their clients to pay bills electronically at one location. While there are many advantages to the direct billing model, the one great disadvantage that overshadows the advantages is that the direct billing model does not provide consolidation.

The direct billing model has many advantages for clients over the bill consolidation model. For example, in the direct billing model, a client can view richer billing information. The biller can provide entire billing information for a client because they are only focusing one billing account, of which the biller has full access, for a client. In addition, the client can dispute bills over the direct billing model. Also, in the direct billing model, the client can get immediate confirmation of payments because the biller has the authorization by the client to receive payment from a pre-authorized account. As a result, last minute payments are possible.

However, the disadvantage to the direct billing model is that there is no consolidation of a bills to a particular client. As a result, in order to pay bills from a variety of billers, a client must deal with each biller separately to make an electronic payment. That is, the client must log onto the first direct biller's site to make a payment on a first bill. Then, after completion of the first transaction, the client must log onto a second direct biller's site to make a payment on a second bill. This process continues for all the bills to be paid electronically at the various direct billing sites for the various billers.

As a result, the bill consolidation model is too focused on payments only and cannot provide the richness of billing information desired by a client when reviewing and paying bills. Also, the direct billing model is severely limited by providing billing services only to a single account.

SUMMARY OF THE INVENTION

What is needed is a method and system that combines the advantages of the bill consolidation model and the direct billing model.

Accordingly, various embodiments of the present invention disclose a system and method for a frame-based internet enabled interface. In one embodiment, a system is disclosed for a client-side frame based internet enabled interface. The system comprises a first frame and a second frame in a window. A frame is encapsulates a resource from a third-party internet based service. The first frame encapsulates a resource from a third-party internet based service. The resource is requested by a user through an internet enabling software, such as a browser.

In addition, the second frame comprises user-specific information that is related to the content provided from the resource. More specifically, the user-specific information comprises personalized information for the user that is comprised of previously gathered information. Also, the second frame comprises graphical user interface control elements, such as, buttons, checkboxes, links to other resources from other third-party internet based services, etc.

In another embodiment, a computer controlled method is disclosed that provides a frame-based internet enabled interface. An embodiment begins by providing a first frame in a window for display to a user. The first frame encapsulates a web page from a third party internet based service. The web page may be requested by the user through the internet enabling software. The embodiment continues by providing a second frame in the window for display to the user. The second frame comprises user-specific information that is related to content provided from the resource. As such, the user-specific information is helpful to the user when interfacing with the third-party internet based service through the web page.

In addition, in various embodiments of the present invention, by virtue of providing the frame of the resource associated with third-party internet based service, user interactions with the third-party internet based service on the first frame can be observed. In addition to observation of the interactions, other embodiments are capable of capturing information from the third-party internet based service as provided in said first frame, and storing the information for later access by the user.

Advantages of an electronic billing system in embodiments of the present invention, such as, a consolidated bill management service combines the advantages of a bill consolidation model and a direct billing model. As such, the consolidated bill management service is capable of aggregating information that is associated with a user and presenting that information to the user in a frame-based internet enabled user-interface when the user utilizes the services provided by the bill management service.

DETAILED DESCRIPTION OF THE INVENTION

Figure 1:
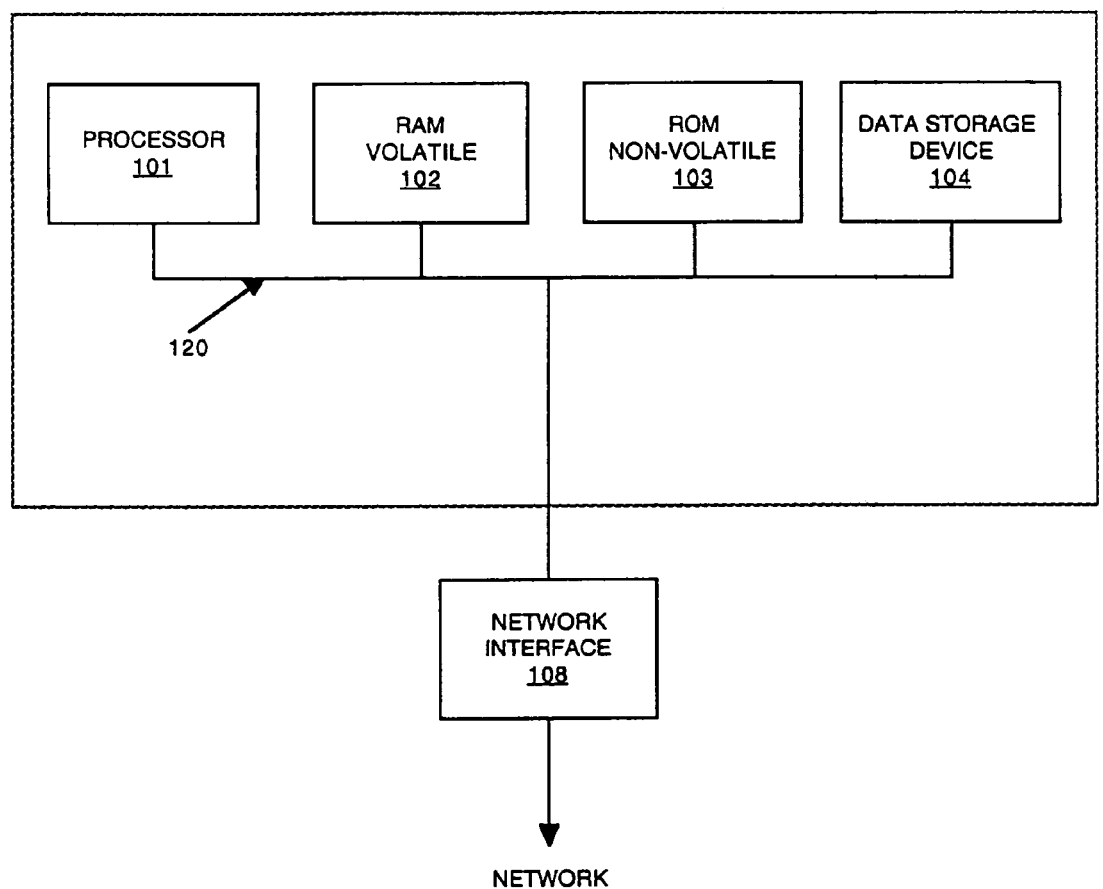
FIG. 1 is a block diagram of an exemplary electronic system that is capable of serving as a platform for a frame-based internet enabled user-interface, in accordance with one embodiment of the present invention.

Reference will now be made in detail to the preferred embodiments of the present invention, a system and method for providing a frame-based internet enabled user interface, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "displaying," "providing," "observing," "collecting," "storing," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Referring to FIG. 1, embodiments of the present invention are comprised of computer-readable and computer-executable instructions which reside, for example, in computer-readable media of a computer system that is capable of deep-linking to a particular resource. That is, embodiments of the present invention can be implemented on software running on a computer system.

FIG. 1 is a block diagram of exemplary embedded components of such a computer system 100 upon which embodiments of the present invention may be implemented. The computer system can be an embedded system, a personal computer, notebook computer, server computer, mainframe, networked computer, handheld computer, personal digital assistant, workstation, and the like.

Exemplary computer system 100 includes an internal address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101. Computer system 100 may also include various forms of disc storage 104 for storing information.

With reference still to FIG. 1, an optional signal input/output (I/O) device 108 is coupled to bus 120 for providing a communication link between computer system 100 and a network environment. As such, signal I/O device 108 enables the central processor unit 101 to communicate with browsers associated with clients that are coupled to the computer system 100. The computer system 100 is coupled to the network (e.g., the Internet) using the network connection, I/O device 108.

Credential Based Deep-Linking for Client Side Bill Payment

Accordingly, various embodiments of the present invention disclose a system and method for providing a frame-based internet enabled user-interface. As a result, in an electronic billing system, a consolidated bill management service is provided that combines the advantages of a bill consolidation model and a direct billing model. As such, the consolidated bill management service is capable of aggregating information that is associated with a user and presenting that information to the user in a frame-based internet enabled user-interface when the user utilizes the services provided by the bill management service.

Although embodiments of the present invention are described within the context of a portal bill management service and other third-party internet based billing services, other embodiments are well suited to other types of services provided by a consolidating portal that gather information from and provide access to varying third party internet based services. For example, embodiments of the present invention are suited to supporting a consolidated investment trading service that gathers information from and provides access to direct or third-party trading services.

Figure 2:
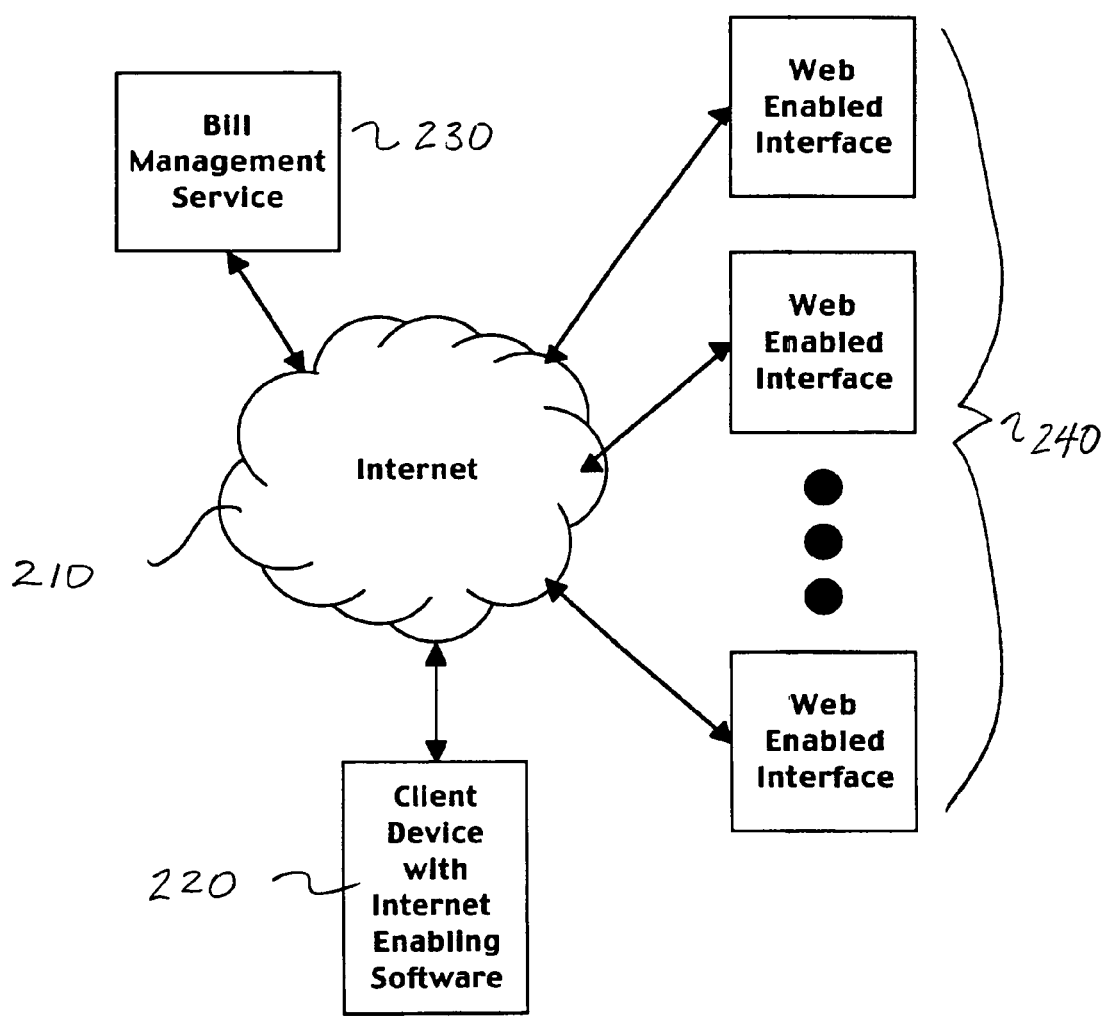
FIG. 2 is a block diagram of a communication network that includes an information service that is capable of setting up a deep-link between an end-user and a particular web page, in accordance with one embodiment of the present invention.

Referring now to FIG. 2, a block diagram of an exemplary communication network 200 is disclosed that is capable of supporting the credential based deep-linking to an internet based service, or more specifically, a particular resource (e.g., a web page) in the internet based service, in accordance with one embodiment of the present invention. In this way, a bill management service is capable of supporting a client side bill payment model that is capable of deep-linking between a client-device associated with an end user and a third party-internet based service to allow the end-user to utilize services provided by the third party internet based service.

While embodiments of the present invention are directed to Internet based services that comprise bill management services, other embodiments of the present invention are well suited to internet based services that comprise other services, such as, stock trading services, travel services, etc.

The communication network 100 is comprised of an internet enabling software 220 (e.g., browser) that is associated with a client device or computer, the internet 210, an information service (e.g., bill management service 230), and a plurality of third-party internet based services 240 that are coupled together through the communication network 200. The end-user via the internet enabling software 220 and the internet 210 accesses the bill management service 230 to obtain and view information provided by the third-party internet based services 240 in order to utilize the services of the internet based services 240. For example, in one embodiment, the end-user through the internet enabling software 220 and the internet 210 accesses the bill management service 230 to set up direct-links between the internet enabling software 220 and each of the plurality of third-party internet based services 240 for direct payment of bills.

In addition, the information service 230 accesses each of the plurality of third-party internet based services 240 through the internet 210 to aggregate information that is particular to the end-user associated with the Internet enabling software 220. As such, each of the plurality of third-party internet based services 240 contain and comprise information that is specific, to the end-user. Also, in one embodiment, each of the third-party internet based services provide credential access to that information to those who provide the proper credentials. For example, in an electronic billing application, the bill management service 230 periodically accesses each of a plurality of direct billing third-party internet based services to retrieve billing information that is specific to the client The internet 210, in general, comprises a set of computer networks that are communicatively coupled together to enable the transfer of data between nodes within the Internet 140. Communication is enabled through a common suite of protocols, such as, the transmission control protocol/internet protocol (TCP/IP). Although the present embodiment is disclosed using the Internet 210, other embodiments are well suited to deep-linking to a particular web page through any network, such as a LAN, or a wide area network (WAN), etc.

Figure 3:
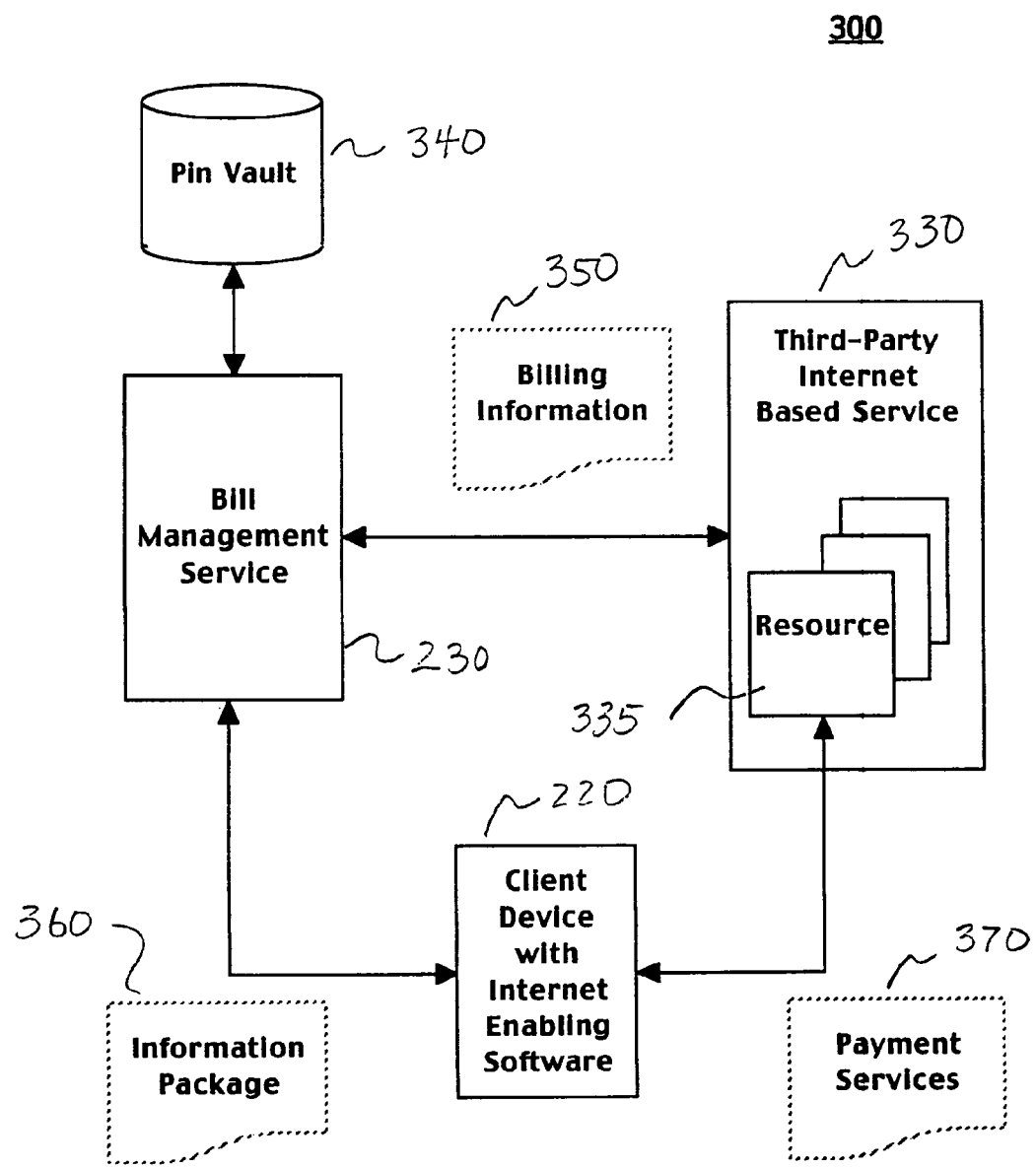
FIG. 3 is a data flow diagram illustrating steps for providing a deep-linking capability between an end-user and particular web page, in accordance with one embodiment of the present invention.

FIG. 3 is a data flow diagram 300 illustrating the ability of the bill management service 230 to provide deep-linking to a specific resource, or web page, 335 in a third-party internet based service 330, in accordance with one embodiment of the present invention. In the electronic billing environment, the bill management service 230 is capable of using deep-linking techniques to leverage the existing services provided by a plurality of third-party Internet based services, such as, the third-party Internet based service 330. That is, the bill management service 230 is able to provide the services of the third-party internet based service 330 directly to the client through the internet enabling software 220 through frames in a window, as provided for in embodiments of the present invention.

As a preliminary step, the end-user has initiated services with the bill management service 230 and the third-party internet based service 330. That is, the end-user has initiated an account with the bill management service 230. In that way, the bill management service 230 can provide secure access to aggregated billing information solely for the end-user. In addition, the client has preliminarily activated and initiated electronic bill payment services with the third-party internet based service 330. That is, the end-user has initiated an electronic bill payment service with the third-party internet based service that provides for direct billing, such as, a direct billing site associated with a utility company. Also, the third-party internet based service 330 provides credential access to the billing information particular to the end-user. In that way, the direct billing site can provide secure access to the billing information to those who provide the correct credentials, such as, the client and agents of the end-user (e.g. the bill management service 230).

The end-user has preliminarily provided the bill management service 230 with the proper credentials to access the third-party internet based service 330. The credentials are stored in the pin vault 340 for access by the bill management service 230. For example, the credentials comprise user identification and user password necessary for access to the third-party internet based service 330, in one embodiment. Other embodiments are well suited to supporting other credential information specific to other third-party internet based services.

Since the bill management service 230 has the correct credential information associated with the end-user, the bill management service 230 can act on behalf of the end-user to access billing information 350 accessible on the third-party internet based service 330. The billing information is particular to the end-user. That is, the bill management service 230 periodically accesses the third-party Internet based service 330 to scrape or gather billing information 350 that is specific to the end-user. Aggregation of the billing information 350 can occur in batch mode or real time mode, in embodiments of the present invention.

In particular, this process does not require the direct participation on the part of the direct billers associated with the plurality of third-party internet based services (e.g., service 330), in one embodiment. Nor does this process require any technology changes on the part of the direct billers from which billing information is aggregated. That is, any pre-existing third-party internet based service, e.g., web site, an open financial exchange (OFX) server, etc., is leveraged to provide deep-linking to particular web sites for utilizing services provided at the web sites.

The billing information 350 includes specific details of billing information, such as, total amount due, etc. This billing information is organized in summary form and sent to the internet enabling software 220 for presentment to the end-user. Consolidation of billing information from multiple direct billing third-party internet based services is possible, in another embodiment. As such, a consolidation of billing information in summary form is presented to the client via the internet enabling software 220.

In addition, the billing information 350 that is gathered from the third-party internet based service 330 includes other navigation information that outlines the infrastructure of the third-party internet based service 330. In that way, relationships between specific information that is associated with a specific resource 335 in the third-party internet based service 330 are gathered and sent to the bill management service 230. For example, the specific resource 335 may provide the interface for paying a specific bill discovered in the billing information 350.

More particularly, specific navigation information is provided to help navigate to that specific resource 335. The navigation information may include a uniform resource locator (URL), list of web pages, cookie information, or other parameters that set up the infrastructure of the third-party internet based service 330.

The bill management service 230 provides in summary form a consolidated view of all the billing information gathered from a plurality of third-party internet based services. Included within this view is billing information 350 gathered form the third-party internet based service 330. For example, billing information 350 may comprise information pertaining to a specific bill that is payable via specific resource 335.

Figure 4:
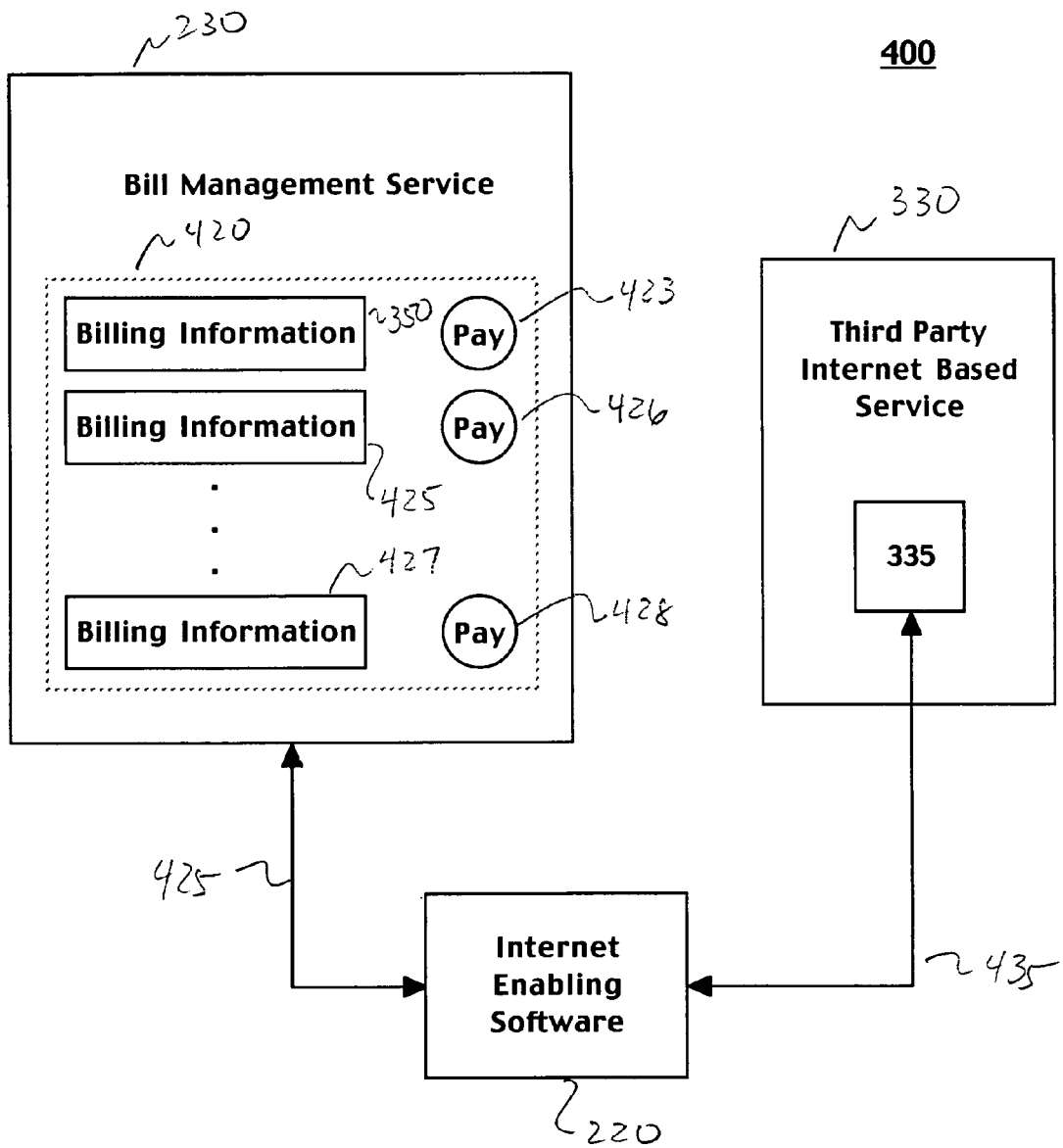
FIG. 4 is a flow diagram illustrating the communication channels opened to obtain windows viewable by an end-user that has requested access to a resource through a host portal, in accordance with one embodiment of the present invention.

FIG. 4 is a flow diagram 400 illustrating the communication channels opened to obtain windows viewable by an end-user that has requested access to a resource over a communication network, such as the internet, in accordance with one embodiment of the present invention. In FIG. 4, the end-user is associated with the internet enabling software 220, such as, a browser.

The end-user through the internet enabling software 220 has established communication with a bill management service 230, as shown by communication path 425. As a result, the bill management service 230 is able to transmit for display a web page 420 that includes in summary a view of billing information, as described previously.

For example, the information is provided in a table format that provides in a consolidated view of billing information that is specific to the end-user, in one embodiment. Although the present embodiment provides a consolidation of billing information in a table format, other embodiments are well suited to presenting billing information in other formats, such as a list.

In FIG. 4, billing information is provided in the bill management service web page 420 for a variety of bills. For instance, a summary of first billing information 350 is included, a summary of second billing information 425 is included, on up to a summary of $n^{th}$ billing information 427. The first billing information 350 is shown in FIG. 3 also. Each of the billing information 350, 425, and 427 is related to a separate bill, that can be serviced through an associated biller web site, that is presented to the end-user in the web page 420.

Each of the billing information 350, 425, and 427 was previously gathered and aggregated by the bill management service 230 from an associated third-party internet based service. For example, billing information 350 was gathered from resource 335 of FIG. 3. The billing information may include total amount due, total charges accumulated, etc. Items in the summary view are selectable by the bill management service 230, in one embodiment, or by the end-user, in another embodiment, or a combination of both, in other embodiments.

In addition, an associated pay bill button, or link, is provided that when activated sets up and creates a direct link to an associated resource for services. For example, pay bill link 423 sets up a deep-link to an associated resource, e.g. resource 335, to allow the end-user to make payment on the first billing information 350. Also, pay bill link 426 sets up a deep-link to an associated resource to allow the end-user to make payment on the second billing information 425. Moreover, pay bill link 428 sets up a deep-link to an associated resource to allow the end-user to make payment on the $n^{th}$ billing information 427.

Figure 5:
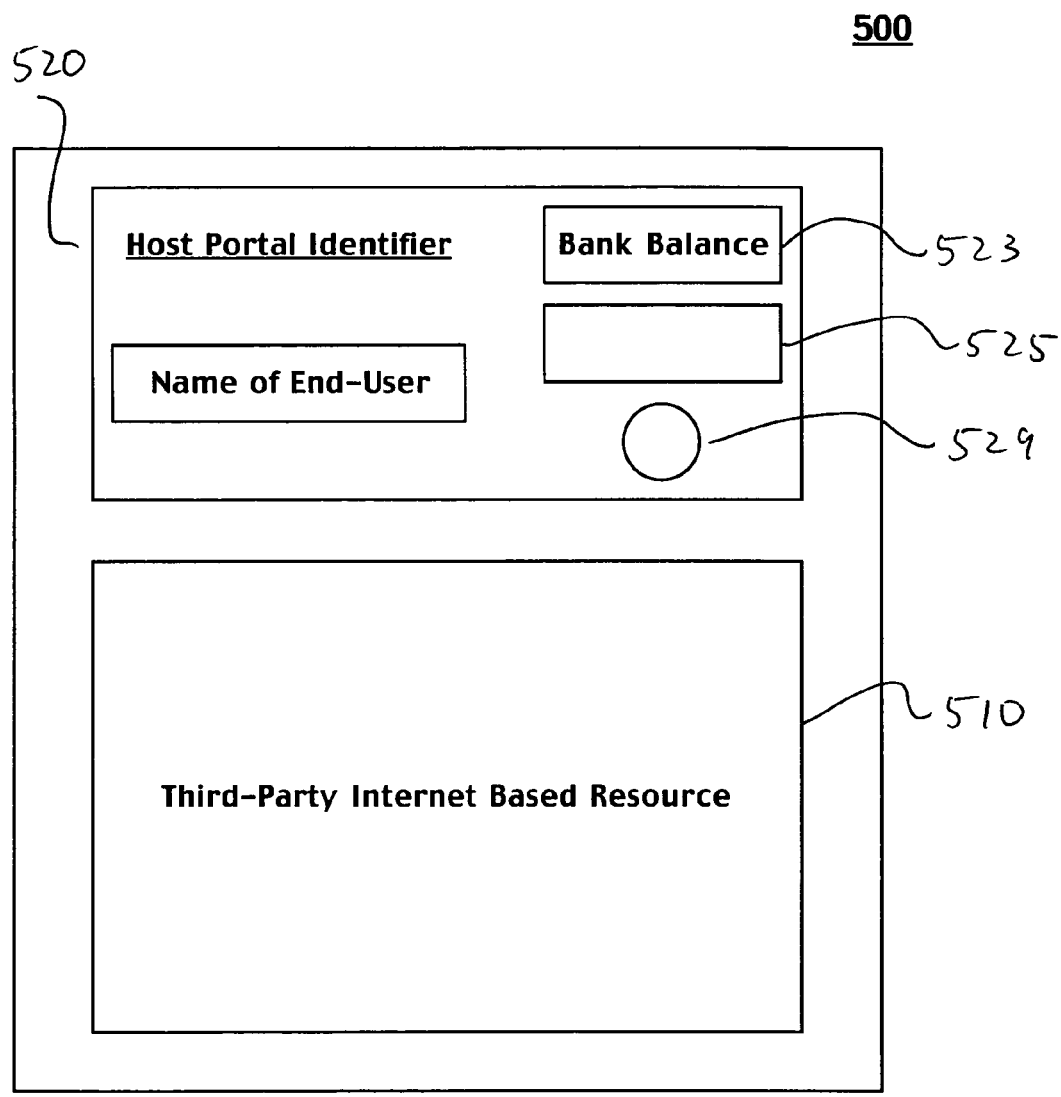
FIG. 5 is a block diagram of a window comprising a frame-based internet enabled user interface, in accordance with one embodiment of the present invention.

More particularly, activation of the pay bill link 423 enables deep-linking by the Internet enabling software 220 on the client device to the associated web page, resource 335, as shown by the deep-link communication path 435. As a result, a deep-link is created to directly link the Internet enabling software 220 with the resource 335 so that the end-user can utilize payment services on the resource 335 to make payment on the first billing information 350. The deep-link is presented to the end-user in a separate frame or window 500, as shown in FIG. 5. As such, two separate channels of communication are established for the client through the internet enabling software 220.

FIG. 5 is a block diagram illustrating a window 500 that provides an internet enabled interface between an end-user and a third-party internet based service, in accordance with one embodiment of the present invention. The window 500 is presented to the end-user to provide the internet-enabled interface. The window 500 is associated with a host portal, such as, a consolidated billing service, that provides direct access to the content provided in the window 500 for an end-user.

The window 500 is comprised of a frame 510. The frame 510 encapsulates a resource from a third-party internet based service as requested by the end-user through an internet enabling software. In this way, a direct communication link is established between the internet enabling software and the third party Internet based service to provide an interface for the user with the third-party internet based service through the frame 510. As such, the end-user can interface with the third-party internet based service through the frame 510 as enabled by the internet enabling software.

For example, the frame 510 comprises the third party internet enabled resource 335 of FIG. 4. In this way, the end-user can utilize the services as provided by the internet based service 330 to pay a bill that is associated with billing information 350. As such, payment of the bill is completed through the interface with the third party internet enabled resource 335 as established in frame 510.

The request for access to the third-party internet based resource is initiated at a host portal by the end-user to request the resource. In one embodiment, another direct communication link is established and simultaneously continued between the internet enabling software and the host portal that provides a consolidation service, such as a bill management service. In that case, when the link to the third-party internet based resource in frame 510 is de-activated, the end-user still has communication with the host portal associated with the bill management service.

The window 500 also comprises a frame 520. The frame 520 comprises user-specific information that is related to content provided from the resource that is displayed in frame 510. The user-specific information is displayed in the frame 520 via text blocks, in one embodiment. For instance, block 522 contains the name of the end-user. Blocks 523 and 525 contain other text information that is personal to the end-user.

The user-specific information may comprise personalized information that is pertinent or helpful to the interfacing between the end-user and the third-party internet based service. For instance, the personalized information contains a bank balance in block 523, associated with the end-user, from which the end-user can determine if there are sufficient funds to pay a specific bill. In this case, the first frame 510 provides an interface to the third-party internet based service that enables the end-user to pay a specific bill. In another case, the personalized information may contain frequent flier mileage that is associated with the end-user when the end-user is interfacing with and accessing a third-party internet enabled travel service. Other personalized information, such as, personalized advertisements, is well-suited for display within the frame 520 to provide information to the end-user that is pertinent to his or her interfacings with the third-party internet based resource as provided in frame 510.

In another embodiment, the window 500 is capable of supporting multiple frames that encapsulate multiple resources from various third party internet based services. For example, the window 500 comprises a third frame, wherein the third frame encapsulates another resource, or web page, from another third-party internet based service. This other resource is also requested by the end-user through an interface with the host portal. As such, the frame 520 also would comprise other user-specific information that is related to content provided from the third frame.

In another embodiment, the frame 510 comprises one or more user-interface control elements. For example, control element 529 provides for an actionable interface to the end-user. Any type of control element 529 is suitable, such as, a control button, checkbox, link to a web page, etc.

Figure 6:
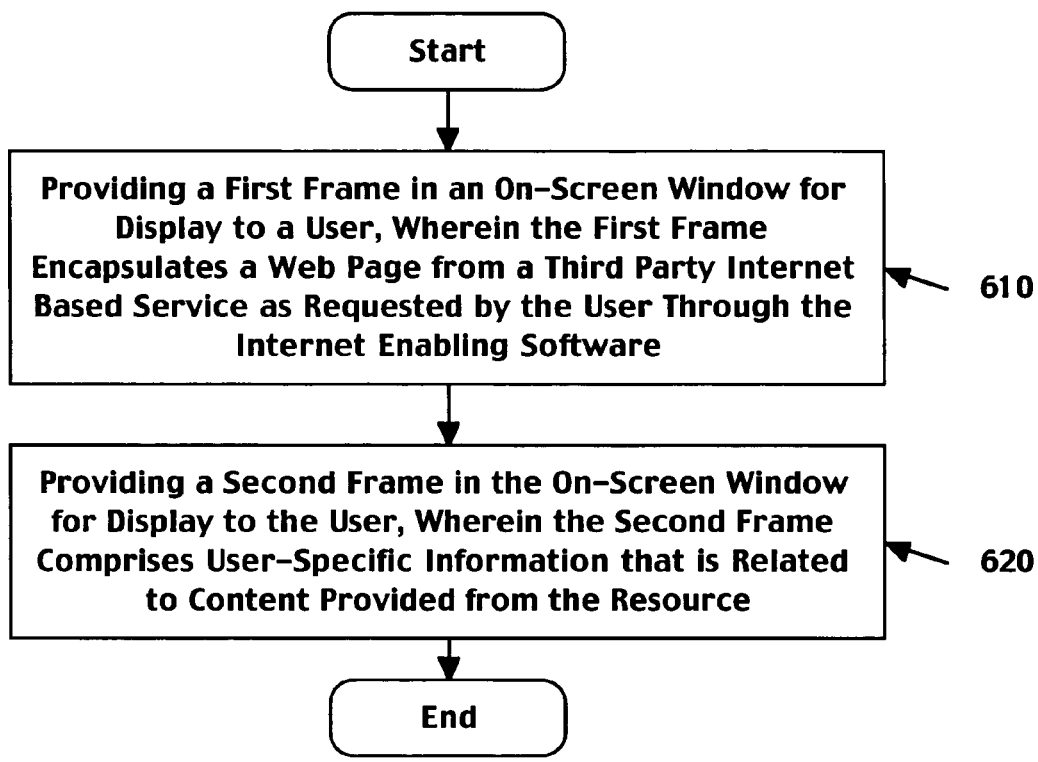
FIG. 6 is a flow chart illustrating steps in a computer implemented method for providing a frame-based internet enabled user interface, in accordance with one embodiment of the present invention.

Referring now to FIG. 6, a flow chart 600 is disclosed illustrating steps in a computer implemented method for providing a frame-based internet enabled user interface, in accordance with one embodiment of the present invention. The flow chart 600 is implemented upon request by an end-user to access a resource from a portal web site that provides consolidation services. The consolidation service, such as, a bill consolidation service, provides a summary of information gathered from various third-party internet enabled services, and provides access to those third-party internet enabled services. A separate communication link or path is established between an internet enabling software associated with the end-user and the host web site, in one embodiment.

The present embodiment begins by displaying a first frame in a window for display to an end-user, in 610. The first frame encapsulates a web page, or resource, from a third party internet based service. As previously described, the end user requests assess to the web page from a portal web site. Communication between the end-user and the portal web site, as well as the third-party internet based service is provided through an internet enabling software.

The present embodiment has established a deep-link to the resource. Deep-linking the internet enabling software to the resource associated third-party internet based service, allows the end-user more detailed access to information. For example, the direct deep-link enables the end-user to navigate through the third-party internet based service to view more detailed billing information that is provided by the third-party internet based service. In addition, the deep-link establishes a communication path between the internet enabling software and the third-party Internet based service to provide an interface for the end-user with the third-party internet based service through the first frame.

At 620, the present embodiment displays a second frame. The second frame comprises user-specific information that is related to content provided from the resource. In one embodiment, some of the user-specific information previously was determined by gathering information from various third-party internet based services and aggregating that information. As previously described, the user-specific information may comprise banking balance information, frequent flier mileage information, trading account information, etc.

In another embodiment, the first frame comprises a user-interface control element. In this way, actionable items can be provided to the end-user outside of the interface with the third-party internet based resource. The user-interface control element can comprise, a control button, checkbox, link, etc. For example, the control element can be configured to provide a means for de-activating the deep-link to the third-party Internet based resource, and returning to the host web site.

In another embodiment, a third frame is displayed in the window. The third frame encapsulates a second resource from another third-party internet based service as requested by the user through the internet enabling software. For example, the third frame may contain billing information related to another bill. As such, the second frame comprises other user-specific information that is related to the content provided from the second resource.

In another embodiment, the end-user actions with the resource in the first frame are observed and noted. As such, the interfacing between the end-user and the third-party internet based service can be monitored. For instance, the actions of paying a bill by the end-user is observed and noted. In one embodiment, the actions are sent to the host web site for storage. In that way, the end-user is able to query the host web site to determine if a particular bill has been paid through the third-party internet based resource.

Further, information that is provided by the third-party internet based resource in the first frame is captured. The information that is captured is stored for later access by the end-user. In one embodiment, the information that is captured is sent to the host web site for storage.

For example, when an end-user pays a bill through the third-party internet based resource, a confirmation number is passed back to the end-user via the first frame. The confirmation number is captured, and stored. The confirmation number is stored at the host web site, such as, the consolidated billing service host site. As such, at a later time, the confirmation number may be accessed by the end-user to determine whether a bill has been paid or not through the third-party internet based resource that is associated with the third-party Internet based service.

While the methods of embodiments illustrated in flow chart 600 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for a frame-based internet enabled user interface have been described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

What is claimed:

1. An interactive interface in a display of a user-operated Internet-connected computer, comprising:
    a first Internet-connected server executing first software on a first processor from a non-transitory physical medium;
    a second Internet-connected server executing second software on a second processor from a non-transitory physical medium;
    a window in the interactive interface provided by the first Internet-connected server;
    a first frame in the window encapsulating and displaying a resource provided by the second Internet-connected server, the resource requested by a user through the first Internet-connected server, enabling the user to initiate a transaction directly with the second Internet-connected server via direct user interaction with the resource within the first frame without the user leaving the window provided by the first Internet-connected server; and
    a second frame in said window, wherein said second frame displays user-specific personal information previously scraped from the second Internet-connected server and stored at the first Internet-connected server, the user-specific personal information providing live interaction between the user and the second Internet-connected server, said user-specific personal information including at least log-in credentials for the user and a bill and billing amount owed by the user to a host of the second Internet-connected server;
    wherein the resource comprises a direct communication link providing real time access and interaction with the second Internet-connected server for the user, and the first Internet-connected server monitors the direct interaction between the user and the second Internet-connected server in the first frame and provides the personal information from the second frame to the first frame when required to interact and complete the transaction with the second Internet-connected server.

2. The interactive interface of claim 1, further comprising:
    a second direct communication link between the software and a host portal that provides a bill management service.

3. The interactive interface of claim 1, wherein said user specific personal information comprises a bank balance associated with a financial account owned by the user.

4. The interactive interface of claim 1, wherein said resource comprises an interface for paying a specific bill, said bill referenced in the user-specific personal information displayed in the second frame.

5. The interactive interface of claim 1, further comprising:
    a third frame in said window, wherein said third frame encapsulates a second resource from a third Internet-connected server, requested by said user, wherein said second frame comprises second user-specific personal information providing live interaction between the user and said third Internet-connected server.

6. The interactive interface of claim 1, wherein said first frame further comprises at least one user-interface control element when initiated by the user causes a specific action associated with the resource.

7. The interactive interface of claim 6, wherein said user interface control element comprises a control button.

8. The interactive interface of claim 6, wherein said user interface control element comprises a link.

* * * * *